US007219832B2

(12) United States Patent
Fillinger et al.

(10) Patent No.: US 7,219,832 B2
(45) Date of Patent: May 22, 2007

(54) ATM MACHINE AND METHODS WITH CURRENCY CONVERSION CAPABILITIES

(75) Inventors: Charles A. Fillinger, Boca Raton, FL (US); Barry O'Sullivan, Kilgarvan (IE)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 0 days.

(21) Appl. No.: 11/154,102

(22) Filed: Jun. 15, 2005

(65) Prior Publication Data

US 2006/0022032 A1 Feb. 2, 2006

Related U.S. Application Data

(60) Provisional application No. 60/588,169, filed on Jul. 14, 2004, provisional application No. 60/580,985, filed on Jun. 17, 2004.

(51) Int. Cl.
*G07F 19/00* (2006.01)

(52) U.S. Cl. .............................. 235/379; 902/8; 902/13; 902/14; 705/42; 705/43

(58) Field of Classification Search ................ 235/379; 902/8, 14, 13; 705/42, 43
See application file for complete search history.

(56) References Cited

U.S. PATENT DOCUMENTS

| 3,599,151 A | 8/1971 | Harr |
| 3,783,755 A | 1/1974 | Lagin |
| 3,833,395 A | 9/1974 | Gosnell |
| 4,032,931 A | 6/1977 | Haker |
| 4,321,672 A | 3/1982 | Braun et al. |
| 4,454,414 A | 6/1984 | Benton |
| 4,528,643 A | 7/1985 | Freeny, Jr. |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |

(Continued)

FOREIGN PATENT DOCUMENTS

AU 763008 B 7/2003

(Continued)

OTHER PUBLICATIONS

About Western Union: Company History; http://www.payment-solutions.com/history.html, 2005, 2 pages.

(Continued)

*Primary Examiner*—Jared J. Fureman
*Assistant Examiner*—Kristy A. Haupt
(74) *Attorney, Agent, or Firm*—Townsend and Townsend and Crew LLP

(57) ABSTRACT

Methods, systems, and Automated Teller Machines (ATMs) are disclosed which provide ATM currency conversion capabilities. In one embodiment, a financial account number associated with a financial account maintained by a customer at a financial institution is received, a foreign currency type associated with the financial account is determined, and a choice is presented to the customer at the ATM to conduct a financial transaction in the foreign currency type. A currency selection is received from the customer and at least a portion of the financial transaction is conducted at the ATM in the selected currency.

20 Claims, 5 Drawing Sheets

U.S. PATENT DOCUMENTS

| | | |
|---|---|---|
| 4,722,554 A | 2/1988 | Pettit |
| 4,812,628 A | 3/1989 | Boston et al. |
| 4,902,881 A | 2/1990 | Janku |
| 4,961,142 A | 10/1990 | Elliott et al. |
| 4,972,318 A | 11/1990 | Brown et al. |
| 5,021,967 A | 6/1991 | Smith |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,236,960 A | 8/1993 | Harrison et al. |
| 5,250,906 A | 10/1993 | Bills et al. |
| 5,283,829 A | 2/1994 | Anderson |
| 5,350,906 A | 9/1994 | Brody et al. |
| 5,367,452 A | 11/1994 | Gallery et al. |
| 5,408,077 A | 4/1995 | Campo et al. |
| 5,426,594 A | 6/1995 | Wright et al. |
| 5,448,043 A | 9/1995 | Nakano et al. |
| 5,448,471 A | 9/1995 | Deaton et al. |
| 5,461,217 A | 10/1995 | Claus |
| 5,464,971 A | 11/1995 | Sutcliffe et al. |
| 5,465,206 A | 11/1995 | Hilt et al. |
| 5,470,427 A | 11/1995 | Mikel et al. |
| 5,475,603 A | 12/1995 | Korowotny |
| 5,477,037 A | 12/1995 | Berger |
| 5,477,038 A | 12/1995 | Levine et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,513,117 A | 4/1996 | Small |
| 5,524,073 A | 6/1996 | Stambler |
| 5,555,496 A | 9/1996 | Tackbary et al. |
| 5,570,465 A | 10/1996 | Tsakanikas |
| 5,577,109 A | 11/1996 | Stimson et al. |
| 5,604,802 A | 2/1997 | Holloway |
| 5,622,388 A | 4/1997 | Alcordo |
| 5,629,982 A | 5/1997 | Micali |
| 5,638,283 A | 6/1997 | Herbert |
| 5,649,117 A | 7/1997 | Landry |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,732,400 A | 3/1998 | Mandler et al. |
| 5,745,886 A | 4/1998 | Rosen |
| 5,757,917 A | 5/1998 | Rose et al. |
| 5,764,888 A | 6/1998 | Bolan et al. |
| 5,774,879 A | 6/1998 | Custy et al. |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,794,207 A | 8/1998 | Walker et al. |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,463 A | 11/1998 | Funk |
| 5,870,718 A | 2/1999 | Spector |
| 5,875,435 A | 2/1999 | Brown |
| 5,878,211 A | 3/1999 | Delagrange et al. |
| 5,880,446 A | 3/1999 | Mori et al. |
| 5,893,080 A | 4/1999 | McGurl et al. |
| 5,896,298 A | 4/1999 | Richter |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,881 A | 5/1999 | Schrader et al. |
| 5,909,492 A | 6/1999 | Payne et al. |
| 5,909,673 A | 6/1999 | Gregory |
| 5,910,988 A | 6/1999 | Ballard |
| 5,913,202 A | 6/1999 | Motoyama |
| 5,915,023 A | 6/1999 | Bernstein |
| 5,918,909 A | 7/1999 | Fiala et al. |
| 5,920,629 A | 7/1999 | Rosen |
| 5,920,847 A | 7/1999 | Kolling et al. |
| 5,920,848 A | 7/1999 | Schutzer et al. |
| 5,937,396 A | 8/1999 | Konya |
| 5,949,044 A | 9/1999 | Walker et al. |
| 5,952,639 A | 9/1999 | Ohki et al. |
| 5,953,709 A | 9/1999 | Gilbert et al. |
| 5,953,710 A | 9/1999 | Fleming |
| 5,960,412 A | 9/1999 | Tackbary et al. |
| 5,960,963 A | 10/1999 | Chodack et al. |
| 5,963,647 A | 10/1999 | Downing et al. |
| 5,974,146 A | 10/1999 | Randle et al. |
| 5,974,194 A | 10/1999 | Hirani et al. |
| RE36,365 E | 11/1999 | Levine et al. |
| 5,987,426 A | 11/1999 | Goodwin, III |
| 5,993,047 A | 11/1999 | Novogrod et al. |
| 5,999,624 A | 12/1999 | Hopkins |
| 6,003,763 A | 12/1999 | Gallagher et al. |
| 6,011,833 A | 1/2000 | West |
| 6,012,048 A | 1/2000 | Gustin et al. |
| 6,015,087 A | 1/2000 | Seifert et al. |
| 6,027,216 A | 2/2000 | Guyton |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,058,417 A | 5/2000 | Hess et al. |
| 6,064,990 A | 5/2000 | Goldsmith |
| 6,070,150 A | 5/2000 | Remington et al. |
| 6,070,156 A | 5/2000 | Hartsell et al. |
| 6,070,798 A | 6/2000 | Nethery |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |
| 6,106,020 A | 8/2000 | Leef et al. |
| 6,119,106 A | 9/2000 | Mersky et al. |
| 6,119,931 A | 9/2000 | Novogrod |
| 6,122,625 A | 9/2000 | Rosen |
| 6,128,603 A | 10/2000 | Dent et al. |
| 6,134,561 A | 10/2000 | Brandien et al. |
| 6,145,738 A | 11/2000 | Stinson et al. |
| 6,148,377 A | 11/2000 | Carter et al. |
| 6,149,056 A | 11/2000 | Stinson et al. |
| 6,164,528 A | 12/2000 | Hills et al. |
| 6,167,386 A | 12/2000 | Brown |
| 6,175,823 B1 | 1/2001 | Van Dusen |
| 6,189,787 B1 | 2/2001 | Dorf |
| 6,193,152 B1 | 2/2001 | Fernando et al. |
| 6,199,761 B1 | 3/2001 | Drexler |
| 6,202,054 B1 | 3/2001 | Lawlor et al. |
| 6,206,283 B1 | 3/2001 | Bansal et al. |
| RE37,122 E | 4/2001 | Levine et al. |

| | | | | | | |
|---|---|---|---|---|---|---|
| 6,223,168 B1 | 4/2001 | McGurl et al. | | 2002/0153414 A1 | 10/2002 | Stoutenburg et al. |
| 6,246,996 B1 | 6/2001 | Stein et al. | | 2002/0161702 A1 | 10/2002 | Milberger et al. |
| 6,247,047 B1 | 6/2001 | Wolff | | 2003/0024979 A1 | 2/2003 | Hansen et al. |
| 6,260,024 B1 | 7/2001 | Shkedy | | 2003/0028491 A1 | 2/2003 | Cooper |
| 6,263,446 B1 | 7/2001 | Kausik et al. | | 2003/0046234 A1* | 3/2003 | Takadachi ............ 705/43 |
| 6,269,369 B1 | 7/2001 | Robertson | | 2003/0055780 A1 | 3/2003 | Hansen et al. |
| 6,275,829 B1 | 8/2001 | Angiulo et al. | | 2003/0069856 A1 | 4/2003 | Seifert et al. |
| 6,286,756 B1 | 9/2001 | Stinson et al. | | 2003/0111529 A1 | 6/2003 | Templeton et al. |
| 6,289,322 B1 | 9/2001 | Kitchen et al. | | 2003/0120777 A1 | 6/2003 | Thompson et al. |
| 6,292,789 B1 | 9/2001 | Schutzer | | 2003/0126036 A1 | 7/2003 | Mascavage et al. |
| 6,305,604 B1 | 10/2001 | Ono | | 2003/0126075 A1 | 7/2003 | Mascavage et al. |
| 6,308,887 B1 | 10/2001 | Korman et al. | | 2003/0126083 A1 | 7/2003 | Seifert et al. |
| 6,314,169 B1 | 11/2001 | Schelberg, Jr. et al. | | 2003/0130907 A1 | 7/2003 | Karas et al. |
| 6,317,745 B1 | 11/2001 | Thomas et al. | | 2003/0130940 A1 | 7/2003 | Hansen et al. |
| 6,321,211 B1 | 11/2001 | Dodd | | 2003/0130948 A1 | 7/2003 | Algiene et al. |
| 6,321,984 B1 | 11/2001 | McCall et al. | | 2003/0135459 A1 | 7/2003 | Abelman et al. |
| 6,327,570 B1 | 12/2001 | Stevens | | 2003/0149662 A1 | 8/2003 | Shore |
| 6,327,575 B1 | 12/2001 | Katz | | 2003/0154164 A1 | 8/2003 | Msacavage et al. |
| 6,343,279 B1 | 1/2002 | Bissonette et al. | | 2003/0167237 A1 | 9/2003 | Degen et al. |
| 6,347,305 B1 | 2/2002 | Watkins | | 2003/0177067 A1 | 9/2003 | Cowell et al. |
| 6,360,254 B1 | 3/2002 | Linden et al. | | 2003/0178281 A1* | 9/2003 | Goto et al. ............ 194/206 |
| 6,367,693 B1 | 4/2002 | Novogrod | | 2003/0187789 A1 | 10/2003 | Karas et al. |
| 6,394,343 B1 | 5/2002 | Berg et al. | | 2003/0187791 A1 | 10/2003 | Weichert et al. |
| 6,408,284 B1 | 6/2002 | Hilt et al. | | 2003/0187792 A1 | 10/2003 | Hansen et al. |
| 6,411,942 B1 | 6/2002 | Fujimoto | | 2003/0195811 A1 | 10/2003 | Hayes et al. |
| 6,415,271 B1 | 7/2002 | Turk et al. | | 2003/0208445 A1 | 11/2003 | Compiano |
| 6,438,586 B1 | 8/2002 | Hass | | 2003/0217005 A1* | 11/2003 | Drummond et al. .......... 705/43 |
| 6,449,599 B1 | 9/2002 | Payne et al. | | 2003/0222135 A1 | 12/2003 | Stoutenburg et al. |
| 6,453,300 B2 | 9/2002 | Simpson | | 2003/0222136 A1 | 12/2003 | Bolle et al. |
| 6,473,500 B1 | 10/2002 | Risafi et al. | | 2003/0225689 A1 | 12/2003 | MacFarlane et al. |
| 6,484,936 B1 | 11/2002 | Nicoll et al. | | 2004/0015438 A1 | 1/2004 | Compiano |
| 6,488,203 B1 | 12/2002 | Stoutenburg et al. | | 2004/0024701 A1 | 2/2004 | Hansen et al. |
| 6,502,747 B1 | 1/2003 | Stoutenburg et al. | | 2004/0049316 A1 | 3/2004 | Pintsov et al. |
| 6,510,453 B1 | 1/2003 | Apfel et al. | | 2004/0059672 A1 | 3/2004 | Baig et al. |
| 6,539,363 B1 | 3/2003 | Allgeier et al. | | 2004/0068437 A1 | 4/2004 | McGee et al. |
| 6,547,132 B1 | 4/2003 | Templeton et al. | | 2004/0078327 A1 | 4/2004 | Frazier et al. |
| 6,549,119 B1 | 4/2003 | Turner | | 2004/0088248 A1 | 5/2004 | Cutler |
| 6,554,184 B1 | 4/2003 | Amos | | 2004/0088261 A1 | 5/2004 | Moore et al. |
| 6,561,339 B1 | 5/2003 | Olson et al. | | 2004/0098328 A1 | 5/2004 | Grant et al. |
| 6,575,358 B2 | 6/2003 | O'Callaghan et al. | | 2004/0098335 A1 | 5/2004 | Michelsen |
| 6,609,113 B1 | 8/2003 | O'Leary et al. | | 2004/0107165 A1 | 6/2004 | Blair et al. |
| RE38,255 E * | 9/2003 | Levine et al. ............ 235/380 | | 2004/0117302 A1 | 6/2004 | Weichert et al. |
| 6,618,705 B1 | 9/2003 | Wang et al. | | 2004/0138947 A1 | 7/2004 | McGee et al. |
| 6,701,216 B2 | 3/2004 | Miller et al. | | 2004/0139008 A1 | 7/2004 | Muscavage et al. |
| 6,736,314 B2 | 5/2004 | Cooper et al. | | 2004/0143552 A1 | 7/2004 | Weichert et al. |
| 6,738,689 B2 | 5/2004 | Sansone | | 2004/0148286 A1 | 7/2004 | Rogers |
| 6,761,309 B2 | 7/2004 | Stoutenburg et al. | | 2004/0153398 A1 | 8/2004 | Baumgartner et al. |
| 6,761,311 B1 | 7/2004 | Algiene et al. | | 2004/0158521 A1 | 8/2004 | Newton et al. |
| 6,801,833 B2 | 10/2004 | Pintsov | | 2004/0167860 A1 | 8/2004 | Baxter et al. |
| 6,814,282 B2 | 11/2004 | Seifert et al. | | 2004/0193897 A1 | 9/2004 | Van Volkenburgh |
| 6,827,260 B2 | 12/2004 | Stoutenburg et al. | | 2004/0210476 A1 | 10/2004 | Blair et al. |
| 6,829,588 B1 | 12/2004 | Stoutenburg et al. | | 2004/0210506 A1 | 10/2004 | Algiene et al. |
| 6,847,947 B1 | 1/2005 | Kambour et al. | | 2004/0210521 A1 | 10/2004 | Crea et al. |
| 6,886,742 B2 | 5/2005 | Stoutenburg et al. | | 2004/0210523 A1 | 10/2004 | Gains et al. |
| 6,908,031 B2 | 6/2005 | Seifert et al. | | 2004/0211831 A1 | 10/2004 | Stoutenburg et al. |
| 6,911,910 B2 | 6/2005 | Sansone et al. | | 2004/0254833 A1 | 12/2004 | Algiene et al. |
| 6,922,673 B2 | 7/2005 | Karas et al. | | 2005/0004702 A1 | 1/2005 | McDonald |
| 6,943,312 B2 | 9/2005 | Zimmermann | | 2005/0017067 A1 | 1/2005 | Weinberger |
| 2001/0042785 A1 | 11/2001 | Walker et al. | | 2005/0167481 A1 | 8/2005 | Hansen et al. |
| 2001/0051876 A1 | 12/2001 | Seigel et al. | | 2005/0180550 A1 | 8/2005 | McGee et al. |
| 2001/0054003 A1 | 12/2001 | Chien et al. | | 2005/0187929 A1 | 8/2005 | Staggs |
| 2002/0023055 A1 | 2/2002 | Antognini et al. | | 2005/0209958 A1 | 9/2005 | Michelsen |
| 2002/0046106 A1 | 4/2002 | Ishibashi et al. | | 2005/0209961 A1 | 9/2005 | Michelsen |
| 2002/0062285 A1 | 5/2002 | Amann | | 2006/0149667 A1 | 7/2006 | Barry |
| 2002/0087462 A1 | 7/2002 | Stoutenburg et al. | | | | |
| 2002/0087463 A1 | 7/2002 | Fitzgerald et al. | | FOREIGN PATENT DOCUMENTS | | |
| 2002/0087467 A1 | 7/2002 | Muscavage et al. | | | | |
| 2002/0088851 A1 | 7/2002 | Hodes | | CA | 2383173 A1 | 1/2001 |
| 2002/0091573 A1 | 7/2002 | Hodes | | EP | 0 481 135 A1 | 4/1992 |
| 2002/0104026 A1 | 8/2002 | Barra et al. | | EP | 0 745 961 A2 | 4/1996 |
| 2002/0111908 A1 | 8/2002 | Milberger et al. | | EP | 0 949 596 A2 | 10/1999 |
| 2002/0152168 A1 | 10/2002 | Neofytides et al. | | EP | 1018711 A1 * | 7/2000 |
| 2002/0152176 A1 | 10/2002 | Neofytides et al. | | EP | 1 018 711 A1 | 12/2000 |

| | | |
|---|---|---|
| EP | 1 077 436 A2 | 2/2001 |
| FR | 2728983 A1 | 7/1996 |
| IE | 990584 | 7/2000 |
| WO | WO 96/26508 A1 | 8/1996 |
| WO | WO 96/36926 A1 | 11/1996 |
| WO | WO 98/49644 A1 | 11/1998 |
| WO | WO 98/50875 A2 | 11/1998 |
| WO | WO 99/22291 A1 | 5/1999 |
| WO | WO 99/28872 A1 | 6/1999 |
| WO | WO 00/22559 A1 | 4/2000 |
| WO | WO 00/46725 A1 | 8/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 A1 | 1/2001 |
| WO | WO 01/04846 A1 | 1/2001 |
| WO | WO 01/39093 A1 | 5/2001 |
| WO | WO 02/05195 A1 | 1/2002 |

OTHER PUBLICATIONS

Aeromexico and Western Union Partner to Offer a Cash Payment Option for Booking Airline Tickets; 2004, Press Release, 2 pages.
American Express in New Ad Drive; 1990, American Banker, 1 page.
American Express Introduces Automated Money Order Dispenser; 1991, Professional Check Casher, 1 page.
American Express Money Orders, Travelers Cheques Now on Sale; 1936, Dots and Dashes, 2 pages.
American Express Unit Introduces State-Of-The-Art Automated Money Order Dispenser; 1990, Tri-State Food News, 1 page.
American Greeting Cards Click-Through; 38 pages.
Amerinet, Inc., "Debit-It!—The Best Idea in Payment Systems Since the Credit Card", downloaded from website http://www.debit-it.com/ on Feb. 7, 2000, 8 pages.
Amex aims expansion strategy at local currency exchanges; 1990, Crain's Chicago Business, 1 page.
Amex Money Order Dispenser; 1990, The Nilson Report, 1 page.
Amex tests Moneygram; 1990, Adnews, 1 page.
And a Nine—Second Money Order Dispenser; 1991, Post-News, vol. 17, No. 1, 1 page.
Andrejczak—DIALCG File—American Banker-v164-date May 17, 1999 pp. 2.
Announcing Quick Collect Online; 2002, Western Union's Professional Collector, 3 pages.
Annual Report of First Data Corporation; 1998, 3 pages.
Annual Report of First Data Corporation; 1999, 2 pages.
Annual Report of the President of the Western Union Telegraph Company; 1873, pp. 8-11.
Annual Report of the President of the Western Union Telegraph Company; 1874, p. 8-11.
Annual Report of the Western Union Corporation; 1990, 4 pages.
Annual Report of the Western Union Telegraph Company, 1975, 3 pages.
Annual Report of the Western Union Telegraph Company; 1935, 2 pages.
Annual Report of the Western Union Telegraph Company; 1940, pp. 9 and 22.
Annual Report of the Western Union Telegraph Company; 1947, 2 pages.
Annual Report of the Western Union Telegraph Company; 1949, 2 pages.
Annual Report of the Western Union Telegraph Company; 1951, 2 pages.
Annual Report of the Western Union Telegraph Company; 1953, 2 pages.
Annual Report of the Western Union Telegraph Company; 1954, 3 pages.
Annual Report of the Western Union Telegraph Company; 1973, 5 pages.
Annual Report of the Western Union Telegraph Company; 1974, 2 pages.
Annual Report of the Western Union Telegraph Company; 1978, 2 pages.
Annual Report of the Western Union Telegraph Company; 1981, 2 pages.
AT&T Wireless to Offer Western Union SwiftPay as Replenishment Option for AT&T Free2Go Wireless Prepaid Customers; 2001, PR Newswire Association, 2 pages.
Behind the Scenes of Life; 1996, First Data Corporation Annual Report, 3 pages.
Bidpay.com: Whois search results; 2003, http:www.networksolutions.com/en_US/whois/results.jhtml;jsessionid+VZDZVYDD1J, 2 pages.
BidPay: Seller FAQs—Receiving Payments and Using the Money Order Service; 1999-2003; 7 pages.
Billserv.com Launches bills.com, an internet Portal for Consumers to Pay All Bills Online at No Cost; 2000, Business Wire, 2 pages.
Boneh, Dan: "Beaming Money by Email is Web's Next Killer App"; 1999, PR Newswire, 4 pages.
Business Wire, "E-Commerce, Email and E-greeting Cards Combine in New Web Site Designed by Interactive Bureau", Sep. 14, 1999 (abstract), [online] [retrieved on May 1, 2002], retrieved from PROQUEST Database, 2 pages.
Candygram payment service, 1 page.
CES/NaBANCO Introduces Stored Value Card Technology: Blockbuster Video is First Merchant Partner; 1996, First Data Corporation News Release, 3 pages.
Collect your delinquent accounts by Telegraph; 1933, Form 1229-A, 1 page.
Collection by Money Transfer: MoneyGram Service Removes Time-Consuming Steps to Commercial Collections; 1990, Collector, p. 36.
Common Values: Uncommon Opportunities; 1995, First Data Corporation Annual Report, 2 pages.
Company Profile: The Western Union Convenience Pay Service; 2004, 4 pages.
Confinity, Inc., PayPal.com, How PayPal.com Works, downloaded from website http://www.paypal.com on Feb. 7, 2000, 7 pages.
DOTBANK, The Way to Send and Receive Money on the Internet, downloaded from website http://www.dotbank.com, Feb. 7, 2000, 6 pages.
Dots and Dashes; 1935, vol. 11, No. 9, 4 pages.
FDR to Offer HNC Software's Real-Time Fraud Detection: New distribution Agreement to Benefit Card Banks; 1996, First Data Resources News Release, 3 pages.
Federal Benefits Checks are Going Away-Don't Let Your Customers Go with Them: Announcing the Western Union Benefits Quick Cash Program; 4 pages.
First Data Acquires PaySys International; 2001, Press Release, 2 pages.
First Data Aligns with CyberCash to Offer New Electronic Coin Service; 1996, First Data Corporation News Release, 3 pages.
First Data and Netscape Announce Program to Help Businesses Establish Payment-Enabled Web Sites; 1996, First Data Corporation News Release, 5 pages.
First Data and Netscape Offering Internet Payment Processing Service; 1996, First Data Corporation News Release, 3 pages.
First Data InfoSource Offers Database Analysis with DecisionScope; 1996; First Data Corporation News Release, 2 pages.
First Data to Offer Card Profitability Software from HNC: Distribution Agreement Poised to Repeat Falcon Success;1996, HNC Software, Inc. News Release, 3 pages.
First Data, First USA Paymentech, GE Capital Invest in First Virtual Holdings; 1996, First Virtual Holdings Corporation News Release, 3 pages.
First located example of a money transfer; Aug. 25, 1873, 1 page.
Get your Collect Card; 1939, Dots and Dashes, 2 pages.
Greenia-1952 Website computermuseumli—Lexikon Services 1982 2002-2003 pp. 3.
Guess What? The check's not in the mail; 2001, Western Union's Professional Collector, 3 pages.
Hoffman, Karen Epper; "PayPal Still Running Free"; 2003, Bank Technology News, 3 pages.

How money by phone was paid;; Money Transfer Service: Book of Rules and List of Offices; 1926, Western Union Telegraph Company, 3 pages.
Idealab Company, PayMe.com, downloaded from website http://ssl.idealab.com on Feb. 16, 2000, 7 pages.
If you're not getting your payment with Quick Collect, chances are you're not getting it; 2001, 2 pages.
Intell-A-Check Corp.: "Intell-A-Check!—The Way to get Paid", Intell-A-Check product overview, retrieved from http://www.icheck.com/ on Feb. 7, 2000, 7 pages.
Introducing the Western Union Cash Card Program; 1998, 2 pages.
It takes a certain person to make a good collector. But it takes a good manager to make a champion; 2001, Western Union's Professional Collector, 3 pages.
Lan Airline Alliance Carriers and Western Union Offer Travelers Additional Payment Options; 2005, 3 pages.
Last of the Pony Express Riders Tells His Story; 1932, Dots and Dashes, vol. 8, No. 10, 2 pages.
Latour, Almar; "PayPal Electronic Plan May be on the Money in Years to Come"; 1999, The Wall Street Journal, 2 pages.
Lawton, George; "Biometrics: A New Era in Security"; 1998, Computer, vol. 31, No. 8, pp. 16-18.
Leading Provider of Transaction Card Processing Selects Connect Oneserver Software as a Solution for Advanced Internet Merchant Services: First Data Chooses OneServer as an Application to Deliver the Internet to Banks and Merchants; 1996, press Release, 4 pages.
Levin, Gary; "Western Union not fading into sunset; new services are added as telegrams drop"; 1992, 2 pages.
List of Prepaid Services; http://www.westernunion.com/info/osComparePrePaid.asp, 1 page.
Loved one stranded? Send Cash; 1991, Akron Beacon Journal, 2 pages.
Luxury Brands LLC: WOrld Famous Brands at Liquidation Proces; http://www.auctionbytes.com/cab/pages/payment, 3 pages.
McEnaney-DIALCG File 01896530-Akron Beacon Journal—Jul. 12, 1997—3 Pages.
Messenger Work Full of Adventure, Excitement; 1933, Dots and Dashes, vol. 9, No. 11, 2 pages.
Money Order with confirmation; 1948, 1 page.
Money Orders by Phone; 1935, Fortune Magazine, 3 pages.
Money-wire giants battle for business: Currency exchanges wooed; 1991, Chicago Sun Times, 2 pages.
MoneyZap.com Greeting Card Process Flow; 2000, 2 pages.
Nation Receives Time Over Western Union Network; 1931, Dots and Dashes, vol. 7, No. 5, 2 pages.
Nationwide Credit Collectors Act Globally; 2001, Western Union's Professional Collector, 3 pages.
Netscape Announces Netscape Livepayment to Facilitate Internet Commerce; 1996, Netscape News Release, 4 pages.
New Western Union Swiftpay Service Continues Expansion of Consumer-to-Business Payment Options; 1999, PR Newswire Association, 2 pages.
NTS Completes Merger with EDS Fleet Services; New First Data Unit Sets Sights on New Markets; 1996, NTS Press Release, 3 pages.
Only Western Union, no date, 2 pages.
PayPal for the Palm; http://handheldnews.com/file.asp?ObjectID=5401, Printed date Oct. 10, 2002; 2 pages.
PayPal.com Case Study; http://fox.rollins.edu/~slackman/PayPal.htm, 2003, 7 pages.
PayPal: The way to send and receive money online, 2002; 4 pages.
PayPal-News; http://www.ndrys.com/paypal.html, 2003, 3 pages.
PaySys—company overview, no date, 2 pages.
PaySys signs up four Asian distributors; 1997 Orlando Business Journal, 3 pages.
Picture of Bill payment form or advertisement, no date, 1 page.
Pilgrims Started Thanksgiving Custom; Dots and Dashes, vol. 4, No. 11, Nov. 1928, 2 pages.
Plotkin, Hal; "Beam Me up Some Cash"; 1999, Silicon Valley Insider, 3 pages.
PR Newswire—Western Union Financial Services forms—Aug. 22, 1991.pdf.

Press Release: "Western Union Announces ATM Card Payout for Money Transfer Transactions"; 2001, URL: http://news.firstdata.com/media/ReleaseDetail.cfm?ReleaseID=849995>.
Products and Services for PaySys, no date, 2 pages.
Purchasing American Airlines Tickets Just Got Easier; 2005, 4 pages.
Quick Cash and Quick Collect: Western Union's money-movers; 1990, Newsbriefs, vol. 2, No. 1, 3 pages.
Quick Cash: A safe and reliable way to send funds around the world; http://www.payment-solutions.com/quickcash.html, 2005, 1 page.
Quick Collect Sales Presentation; Jan. 2004, 28 pages.
Quick Collect; Western Union Training Guide; 2004, 10 pages.
Quick Collect: Government/Child Support Agency Name, Training Guide; 2004, 7 pages.
Quick Pay: The Convenient and reliable way to receive payments from customers worldwide; http://www.payment-solutions.com/quickpay.html, 2005, 3 pages.
Refund of Money Transfers; 1913, Journal of the Telegraph, 2 pages.
Remittance for order sent via Western Union; 1933, 2 pages.
Reynolds Arcade was Western Union Birthplace; 1933, Dots and Dashes, vol. 9, No. 8, 2 pages.
Rhode Island becomes first state to accept child support payments at Western Union: More than 50 Western Union Convenience Pay Agent Locations Offer New Level of Convenience to Rhode Island Residents Who Pay Child Support—; 2002, 3 pages.
Rhode Island becomes first state to accept child support payments at Western Union: Government Payment Leader govONE Solutions Adds Walk-in to Full Suite of Payment Options; 2002, 3 pages.
SBC Communications adds Western Union Locations for Walk-in Customer Bill Payments; SBC News Release, Sep. 7, 2005, 2 pages.
Seifert—Method & System for Electronic Transfer—FDC 0167PUS—no date, 21 pages.
Send your payment using Western Union Quick Collect; Feb. 2, 2004, 2 pages.
Send Your Utility Bill Payment from Here!; no date, 3 pages.
Sending Cash in a Flash; 1990, Travel & Leisure, p. 42.
Sending Cash in a Flash: There are more ways to do it than you might think; 1991, 2 pages.
Shopping Order service and gift service; 1934, Western Union Telegraph Company, Money Order Book, 6 pages.
Signature Services: Helping financial institutions send funds faster; http://www.payment-solutions.com/signature.html, 2005, 1 page.
State of Hawaii to Accept Child Support Payments at Western Union; 2004, 2 pages.
State of New York Banking Department: Staff Letters and Memoranda; 2000, http://www.banking.state.ny.us/lo000718.htm, 2 pages.
Steiner, Ina: "Accepting Credit Cards When You Sell Items: ProPay and Billpoint Payment Services"; 2000 Auction Bytes, 4 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Stockel, Anna; "Securing Data and Financial Transactions"; 1995, Institute of Electrical and Electronics Engineers 29th Annual Conference, pp. 397-401.
Stoutenburg—Method & System for Performing Money Transfer Transactions—10-289802—no date, 30 Pages.
Strean, LitleNet, BBN, and KPMG Announce Industry-Wide Initiative to Enable Wide-Scale Software Electronic Commerce; 1996, News Release, 6 pages.
Survey of services; 1960, pp. 2-31.
The Western Union Telegraph Company: Delivery Department Instructions; 1926, Commercial Bulletin No. 9-A, 2 pages.
The Western Union Telegraph Company: Rules for Money Transfer Service; 1908, pp. 3-25.
The Western Union Telegraph Company: Instructions for Receiving Clerks; 1929, Commercial Bulletin No. 37-A, 2 pages.
The Yellow Bank is Correct for every social need; 1930, Western Union Booklet, 2 pages.

The Yellow Blank: When, Why, How to Use It; 1934, 5 pages.
To send a Quick Collect Payment; sample form, no date, 1 page.
Transfers require ID made by telegraph; 1895, Tariff Book, 4 pages.
Transpoint, "The Way to Pay Online", downloaded from website http://www.transpoint.com/ on Feb. 10, 2000, 12 pages.
VeriFone Finance, "Fast,Low-Cost Transaction Automation at the Point of Service", Jan. 1999, 2 pages.
VIPS Introduces MCSource to Managed Healthcare Industry; 1996, VIPS Healthcare Information Systems News Release, 2 pages.
VisionPLUS Consumer Payment Solution Overview, no date, 2 pages.
Wermer, Sandra; "A million credit card transactions in five hours"; 1997, Primeur, 2 pages.
Western Union—Quartlerly Report 3rd Quarter 1975—4 pages.
Western Union and Continental Airlines Introduce New Quick and Easy Cash Payment Option When Booking Flights; 2004, Press Release, 4 pages.
Western Union- BidPay-Buyer FAQs, 1999-2003, 7 pages.
Western Union—Now, using our service is even more rewarding; no date, 4 pages.
Western Union—Some Quick Facts about Quick Collect; no date, p. 1.
Western Union Creates Phone Card with BLT Technologies; 1997, PR Newswire Association, 2 pages.
Western Union Financial Services, Inc.: Benefits Quick Cash Agreement and Disclosure Statement; 1998, 2 pages.
Western Union Financial Services, Inc.: Cash Card Agreement and Disclosure Statement; 1998, 2 pages.
Western Union Financial Services Inc.: There's a lot to be said about the many advantages of the Quick Collect service. And look who's saying it; 1995, 4 pages.
Western Union Gift Greetings; no date, 6 pages.
Western Union Hotel-Motel Reservation Service, no date, 1 page.
Western Union Money Orders More Popular Than Ever: 1942, Dots and Dashes, vol. 18, No. 3, 2 pages.
Western Union Money Transfer & more—Printed date Jun. 10, 2003, 9 pages.
Western Union Money Transfer Services, Send Money Online, Money Orders, Send Telegrams; http://www.westernunion.com/info/osCompareMoneyMessage.asp, 2005, 3 pages.
Western Union Money Transfer Service: Messages with money orders and telephone money order, Feb. 1, 1920, 4 pages.
Western Union New Supplement: Money Orders delivery through Mailgram: 1975, 2 pages.
Western Union News Supplement: Automatic travelers checks using Western Union; 1975, 2 pages.
Western Union Payment Services, Bidpay and Quick Collect, Online Bill Payment, Online Auction Payments; http://www.westernunion.com/info/osComparePayment.asp, 2005, 2 pages.
Western Union Products and Services: a brief description; 1960, 22 pages.
Western Union Quick Collect: First Data Corporation; 2000-2001,2004: 2 pages.
Western Union Quick Collect: The Fastest way to collect good funds; 1999, 11 pages.
Western Union Quick Collect: The most agents, the most locations, the most experienced; 2000, 2 pages.
Western Union Quick Collect; 3 Easy Ways to Send a Payment: In Person, Online or by Phone!; no date, 2 pages.
Western Union SwiftPay Selected by Sheakley Uniservice to Complete W-2 Reprint Transactions; 2000, PR Newswire Association, 2 pages.
Western Union Telegraph Company; 1933 Money Order Message, 17 pages.
Western Union/Money Zap: Send and receive money easily over the internet; http://www.moneyzap.com/main.asp, printed Dec. 1, 2000, 23 pages.
Western Union's Would-Be Rival; 1990, American Banker, 1 page.
Westren Union -Money Transfer Service- Feb. 1, 1920 10th Edition—pp. 119 & 120.
When you're helping a customer make a crucial payment there's no room for guesswork; 2002, Western Union's Professional Collector, 3 pages.
Why Send Your Customers Across Town When You Can Send Them Next Door? 2005, 1 page.
Wijnen, Rene; You've Got Money!; 2000, Bank Technology News, vol. 13, No. 6, 4 pages.
x.com, Do More with Your Money, downloaded from website http://www.x.com., Feb. 7, 2000, 5 pages.
XP-002347909-Western Union Announces ATM Card Payout for Money Transfer Transactions—Oct. 22, 2001, p. 1.
You're sending more than a payment: Point-of-Sale & Merchandising Support Advertising Materials, no date, 2 pages.
You're sending more than a payment: You're sending peace of mind; 2004, 3 pages.

* cited by examiner

ATM MACHINE AND METHODS WITH CURRENCY CONVERSION CAPABILITIES

CROSS-REFERENCE TO RELATED APPLICATION

This application claims the benefit of U.S. Provisional Application Nos. 60/580,985, filed Jun. 17, 2004, and 60/588,169, filed Jul. 14, 2004, the complete disclosures of which are herein incorporated by reference.

BACKGROUND

Automated Teller Machines (ATMs) are used by customers to conveniently perform transactions related to financial accounts. One of the most common transaction involves the withdrawal of money from a checking or savings account. The customer enters the desired withdrawal amount and if the transaction is approved, receives the requested amount. The withdrawal amount is deducted from the customer's account. ATM's may also be used for credit card transactions and credit card cash advances, money transfers, payments (e.g., payment of a bill, such as a cellular phone bill or other bill), balance inquiries, item purchase items (e.g., stamps), electronic purse transactions, and other types of transactions involving the making and receiving of payments.

ATM transactions are conducted using the native currency of the ATM. Thus, an ATM located in the United States conducts transactions in U.S. dollars, while an ATM located in France conducts transactions in Euros. If the customer is using an ATM located in the same country as the customer, the transaction amounts (e.g., the withdrawal amount) are presumably well understood by the customer. However, in instances in which a customer is using an ATM in a foreign country, the customer often does not know how the ATM's native currency corresponds to the customer's native currency amount. Additionally, the exchange rate that will be used to perform the settlement on the transaction is not known to the customer. Even if the customer can make an educated guess about the exchange rate, the conversion must be performed manually by the customer. Thus, a customer usually does not know the exact amount of the transaction in the customer's native currency (e.g., the withdrawal amount deducted from his or her account) until a statement is received from the financial institution.

BRIEF SUMMARY

Methods, systems, and Automated Teller Machines (ATMs) are disclosed which provide ATM currency conversion capabilities. In one embodiment, a financial account number associated with a financial account maintained by a customer at a financial institution is received at an ATM. A foreign currency type associated with the financial account is determined and a choice is presented to the customer at the ATM to conduct a financial transaction in the foreign currency type. A currency selection is received from the customer. At least a portion of the financial transaction at the ATM is conducted in the selected currency.

In some instances, the foreign currency type associated with the financial account may be determined by obtaining an identifier portion of the financial account number (e.g., the bank identification number (BIN) portion). The country associated with the financial account may be determined using the identifier portion. By way of example, the identifier portion may be compared to a lookup table associating financial institution identification numbers to a country. Other methods of determining foreign currency type may also be used.

The currency selection received may be a selection indicating the foreign currency type. In one embodiment, the transaction may be a withdrawal, and conducting at least a portion of the financial transaction may comprise receiving a withdrawal amount in the foreign currency type. The method may then further comprise obtaining an exchange rate to convert the foreign currency type to a native currency type associated with the ATM and converting the withdrawal amount to the native currency type.

Alternately, conducting at least a portion of the financial transaction may comprise receiving a withdrawal amount in a native currency type associated with the ATM. The exchange rate to convert the native currency type to the foreign currency type is obtained and the withdrawal amount is converted to the foreign currency type. The converted withdrawal amount is displayed to the customer.

In a second embodiment, a method is disclosed which comprises receiving, at an ATM network, a request from an ATM to obtain a currency exchange rate from a first currency to a second currency. The currency exchange rate is obtained and provided to the ATM. The method may also further comprise receiving an identifier from the ATM identifying a financial institution associated with a financial account, using the identifier to determine a currency type associated with the financial account, and providing the currency type to the ATM.

In a third embodiment, a system to provide currency conversion information to an ATM is disclosed. The system may comprise an interface, communicatively coupled to an ATM, data, and logic, communicatively coupled to the interface and the data. The interface is configured to receive an identifier portion of a financial account from an ATM. The data associates financial institution identification numbers to at least one of a country and a currency. The logic determines a currency type associated with the financial account using the data and the interface transmits the currency exchange rate to the ATM.

In a fourth embodiment, an ATM is disclosed. The ATM comprises a user interface to receive a financial transaction selection from a customer. The user interface also receives a selection from the customer to conduct a transaction in a foreign currency type different than a native currency type associated with the ATM. Logic processes at least a part of the financial transaction in the foreign currency.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
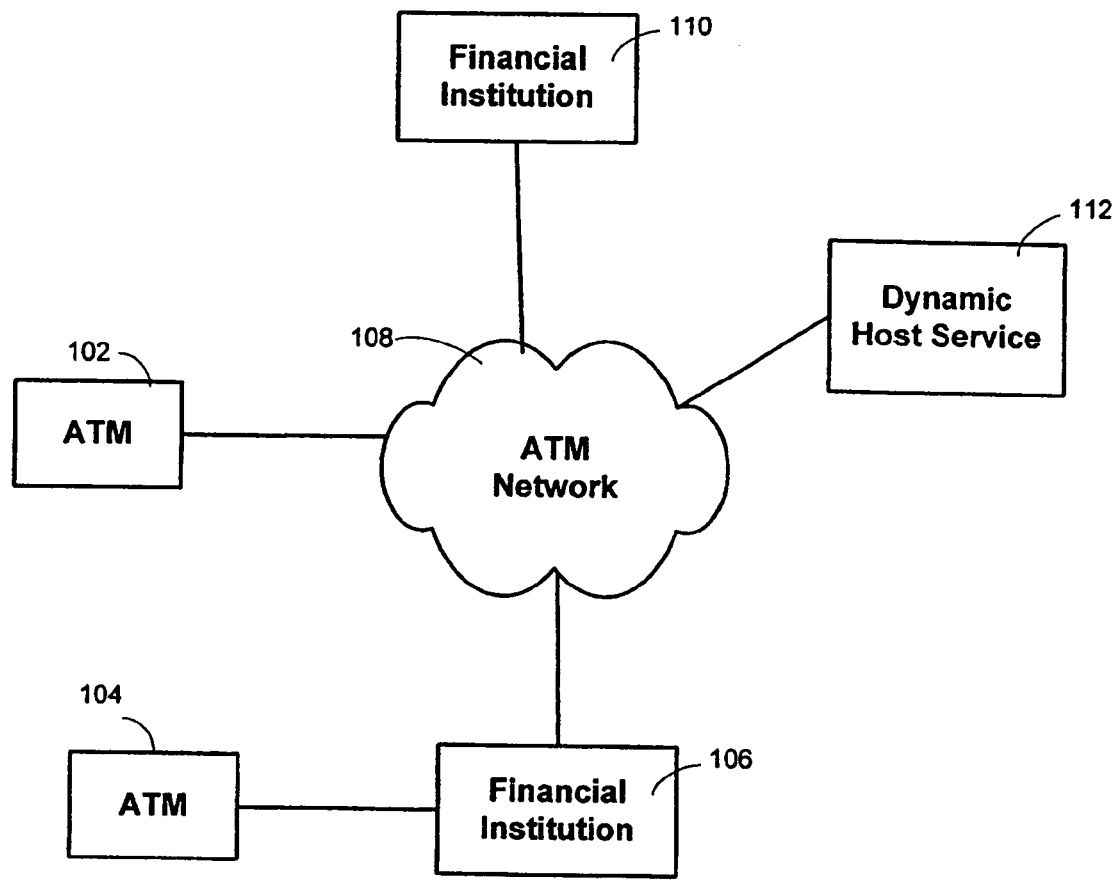
FIG. 1 illustrates a system that may be used to provide currency conversion capabilities in an ATM.

FIG. 1 illustrates a system that may be used to provide currency conversion capabilities in an ATM. The system includes ATMs 102, 104. ATM 102 has a direct communication coupling to ATM network 108, while ATM 104 is communicatively coupled to ATM network 108 via a server at a financial institution 106 associated with the ATM 104. The ATM network 108 may be used to obtain information and authorization for an ATM 102, 104 to perform transactions requested by a customer of the ATM 102, 104. Thus, ATM network 108 is able to communicate with a financial institution 110 associated with the ATM customer's financial account. By way of example, ATM network 108 may be a network, such as the NYCE® network, the Pulse® network, the STAR® network, and the like. ATM network 108 may be used to verify a customer's authentication information (e.g., financial account and personal identification number (PIN)) and to provide authorization to an ATM 102, 104 to perform a transaction, such as a withdrawal of funds from a financial account or a transfer of funds from a first financial account to a second financial account. ATM network 108 may also be used to obtain information on the customer's financial account, such as the account balance. The information and authorization may be provided directly to some ATMs 102 and may be provided to other ATMs 104 via a financial institution server 106. In some instances, the customer's financial account may be maintained at the financial institution 106 associated with the ATM 104. In these instances, financial institution 106 may provide the authorization and other information needed by the ATM 104 without using ATM network 108. It should be appreciated that the system may include many more ATMs 102, 104 and financial institutions 106, 110 than illustrated in FIG. 1.

ATM network 108 is communicatively coupled to Currency Recognition and Exchange Service 112. Currency Recognition and Exchange Service 112 may be a service that is used to provide information on a currency associated with an ATM customer's financial account. Additionally, Currency Recognition and Exchange Service 112 may be used to provide exchange rates to an ATM 102, 104 via ATM network 108. In some embodiments, Currency Recognition and Exchange Service 112 may be used to provide currency exchange information for more than one ATM network 108. Alternately, Currency Recognition and Exchange Service 112 may be a component of ATM network 108. In some embodiments, Currency Recognition and Exchange Service 112 may provide the currency and exchange information dynamically. For instance, the information may be provided when it is requested by financial institution 106 or ATM network 108 on behalf of ATM 102, 104. Alternately, Currency Recognition and Exchange Service 112 may periodically provide currency recognition and exchange information to a server residing on ATM network 108, ATM 102/104, and/or financial institutions 106, 110. By way of example, the information may be transferred as one or more files using file transfer protocol (ftp). The file transfer may be initiated by either the Currency Recognition and Exchange Service 112 or at the initiative of the component on the system receiving the files (e.g., financial institution 106, server on ATM network, etc.).

Figure 2:
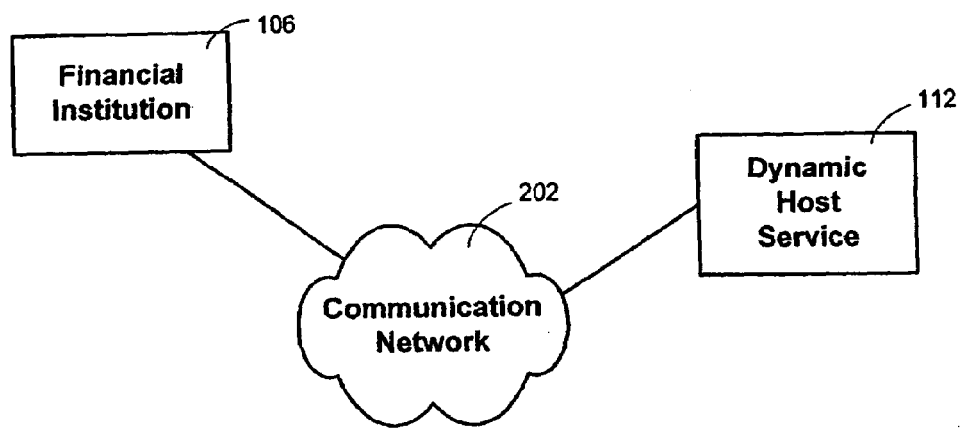
FIG. 2 is a block diagram illustrating an exemplary communication coupling to a currency recognition and exchange service that may be used to provide currency conversion capability in an ATM.

FIG. 2 illustrates a second exemplary communication coupling between financial institution 106 and Currency Recognition and Exchange Service 112. In this embodiment, financial institution 106 is communicatively coupled to Currency Recognition and Exchange Service 112 via a communications network 202, such as a wide area network (WAN). Thus, financial institution 106 may obtain currency recognition and exchange rate information from Currency Recognition and Exchange Service 112 without using ATM network 108. As previously described, financial institution 106 may obtain the information dynamically, as requested by ATM 104, or may locally store information which is periodically transmitted to the financial institution 106 from Currency Recognition and Exchange Service 112 (e.g., via ftp file(s)).

It should be appreciated that various other configurations than those illustrated in FIGS. 1 and 2 may be used to provide currency recognition information and exchange information to ATMs 102, 104. For instance, either or both ATMs 102, 104 may be in direct communications with Currency Recognition and Exchange Service 112. Alternately, Currency Recognition and Exchange Service 112 may be a component of ATM 102, 104 or may be software executing on a financial institution server 106, 110. In these embodiments, Currency Recognition and Exchange Service 112 may periodically obtain exchange rate information and currency recognition information from one or more sources of this information.

Figure 3:
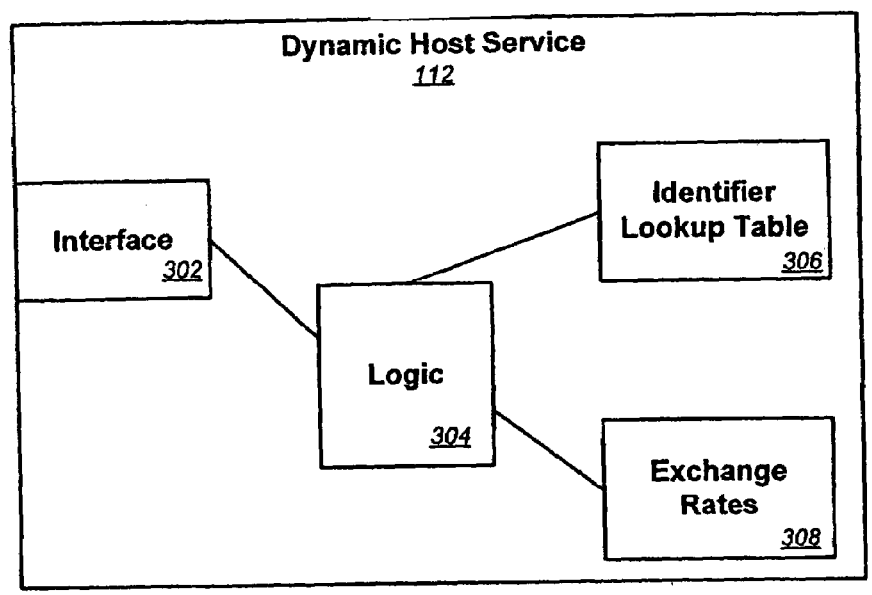
FIG. 3 is a block diagram illustrating an exemplary embodiment of the Currency Recognition and Exchange Service in FIG. 1 and FIG. 2.

FIG. 3 illustrates one exemplary embodiment of a Currency Recognition and Exchange Service 112. Currency Recognition and Exchange Service 112 includes a communications interface 302. Communications interface may be communicatively coupled to a server residing on ATM network 108, one or more financial institutions 106, 110 and/or one or more ATMs 102, 104. In some embodiments, Currency Recognition and Exchange Service 112 may be used to provide currency recognition and/or exchange information to an ATM 102, 104 at the request of another component, such as ATM network 108 or financial institution 106. Alternately, the information may be provided directly to an ATM 102, 104. As will be described in further detail below, interface 302 may be used to receive financial institution identifier portions of financial account identifiers and to communicate a determined currency associated with the financial account. Interface 302 may also further be used to communicate exchange rates to convert from a first currency to a second currency.

Currency Recognition and Exchange Service 112 further includes logic 304, identifier lookup table 306, and exchange rate information 308. Logic 304 is communicatively coupled to interface 302, identifier lookup table 306, and exchange rate information 308. By way of example, logic 304 may be machine-executable instructions, such as a software program. Logic 304 may be used to determine a currency type associated with a financial account using data, such as identifier lookup table 306. Additionally, logic 304 may be used to determine exchange rates by using the exchange rate information 308.

Identifier lookup table 306 and exchange rate information 308 may be stored in one or more databases. The database(s) may be any type of structure that may be used to store information, such as relational databases, internal software lists, text files, spreadsheet files, and the like. Identifier lookup table 306 may contain information associating financial institution identification numbers (e.g., BINs) with a country and/or currency. Other unique identification numbers, such as the ATM card number or customer's financial account may also or alternately be associated with a country and/or currency. Exchange rate information 308 may store information on exchange rates that may be used to convert from a first currency to a second currency. In embodiments in which the lookup table maps financial institution identification numbers to a country, additional information may be stored which maps countries to currencies. In some embodiments, the identifier lookup table 306 may map a range of financial institution identification numbers to a country and/or currency. In these embodiments, the information in the database(s) may further include an exception table (not shown) to map financial institution identification numbers to a currency and/or country different than the one indicated in the associated range of the lookup table.

In the configuration described above, different components were described as being communicatively coupled to other components. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that logic 304, identifier lookup table 306, and exchange rate information 308 may reside on the same or different physical devices. It should also be appreciated that in alternate embodiments, Currency Recognition and Exchange Service 112 may contain additional or fewer components than illustrated in FIG. 3.

As previously described, in alternate embodiments, currency recognition information, such as identifier lookup table 306, and exchange rate information 308 may be periodically provided to a server residing on ATM network 108, financial institution 106, and/or ATMs 102, 104. For instance, files may be periodically transferred or otherwise made available to one or more of these components 108, 106, 102, 104. It should be appreciated that in these embodiments, appropriate logic (e.g., program code) may also reside on the component 108, 106, 104, and/or 102 having the currency recognition and exchange information. The component logic may function similar to logic 304 and may use the transferred data to perform currency recognition and provide exchange rate information at the request of an ATM 102, 104, or additional logic resident to the ATM 102, 104.

Figure 4:
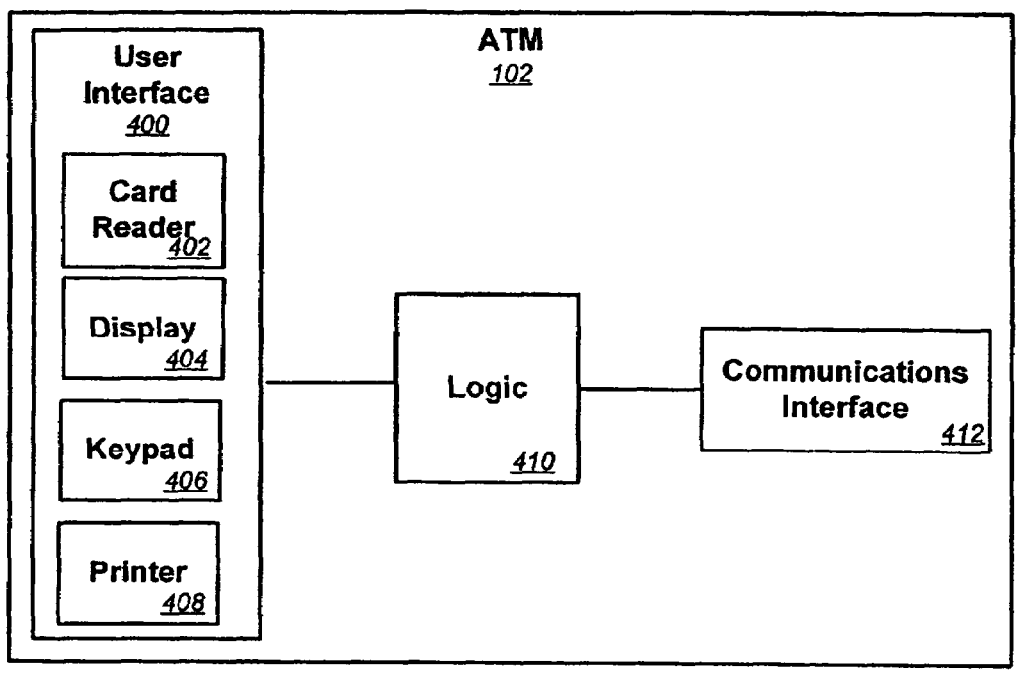
FIG. 4 is a block diagram of an exemplary ATM that may be used to conduct financial transactions in a currency not native to the ATM.

FIG. 4 illustrates an exemplary block diagram of an ATM 102 that may be used to provide currency conversion information to customers. ATM 102 includes a user interface 400. User interface 400 may comprise multiple components, such as card reader 402, display 404, keypad 406, and printer 408. Card reader 402 may be used to receive a customer's ATM card and obtain a financial account number from the ATM card. Display 404 may be used to prompt the customer for responses needed to perform a transaction and to display information to the customer. Keypad 406 may be used to receive input from the customer, such as a personal identification number (PIN) associated with the customer's financial account, transaction selections, dollar amounts for transactions (if applicable), and other information related to a customer's transaction with the ATM. Additionally, as will be described in further detail below, display 404 may be used to display a currency type selection for the transaction and keypad 406 may be used to receive the customer's currency type selection. User interface 400 may also include a printer 408 that may be used to print a receipt of the transaction, and in some embodiments, the customer's remaining account balance.

ATM 102 may further include logic 410 and communications interface 412. Logic 410 may be used to process a financial transaction requested by a customer of the ATM 102. By way of example, the financial transaction may be a withdrawal request, a balance transfer request, a deposit request, a purchase request (e.g., to purchase stamps, telephone calling cards, etc. using funds available in the customer's financial account), or other type of request that may be performed at an ATM. Logic 410 may receive information from user interface 400 and use communications interface 412 to communicate with ATM network 108.

Communications interface 412 is communicatively coupled to a server on ATM network 108. Logic 410 may use communications interface 412 to request authentication of a customer's financial account number received from user interface 400. In some embodiments, the authentication request transmitted to the ATM network 108 may also include a PIN which was received from the customer. Additionally, logic 410 may use communications interface 412 to request authorization of a transaction initiated by the customer. Other information used to perform a financial transaction may also be requested and received using communications interface 412.

As will be described in further detail below, logic 410 may also be used to process at least a part of a financial transaction requested by the customer in a foreign currency which is associated with the customer's financial account and different from a native currency associated with the ATM 102. For instance, logic 410 may prompt the customer to select either the native currency associated with the ATM 102 or a foreign currency type which was determined to be associated with the customer's financial account (the customer's native currency). If the user selects the foreign currency type, logic 410 may use communications interface 412 to obtain exchange rate information. Exchange rate information may be provided by Currency Recognition and Exchange Service 112 via ATM network 108, ATM network 108, or from information accessible to ATM 102. In an alternate embodiment, the information may be stored locally at ATM 102. Logic 410 may use the exchange rate information to convert from the native currency to the foreign currency and display details of the transaction (e.g., withdrawal amount or other financial amounts) in the currency which is foreign to the ATM, but native to the customer. Alternately, logic 410 may not be provided with exchange rate information and may instead use communications interface 412 to obtain converted transaction amounts.

The above description described an ATM 102 that communicates with an ATM network 108 to obtain authentication, authorization, and other transaction information. It should be appreciated that in alternate embodiments, communications interface 412 may communicate with a financial institution 106 to obtain information used to process a transaction, including currency recognition information and exchange rate information. It should also be appreciated that in alternate embodiments, ATM 102 may comprise fewer or additional components than described above. For instance, user interface 400 may not include a keypad 406, but instead may include a touch pad to receive information from a customer.

Figure 5:
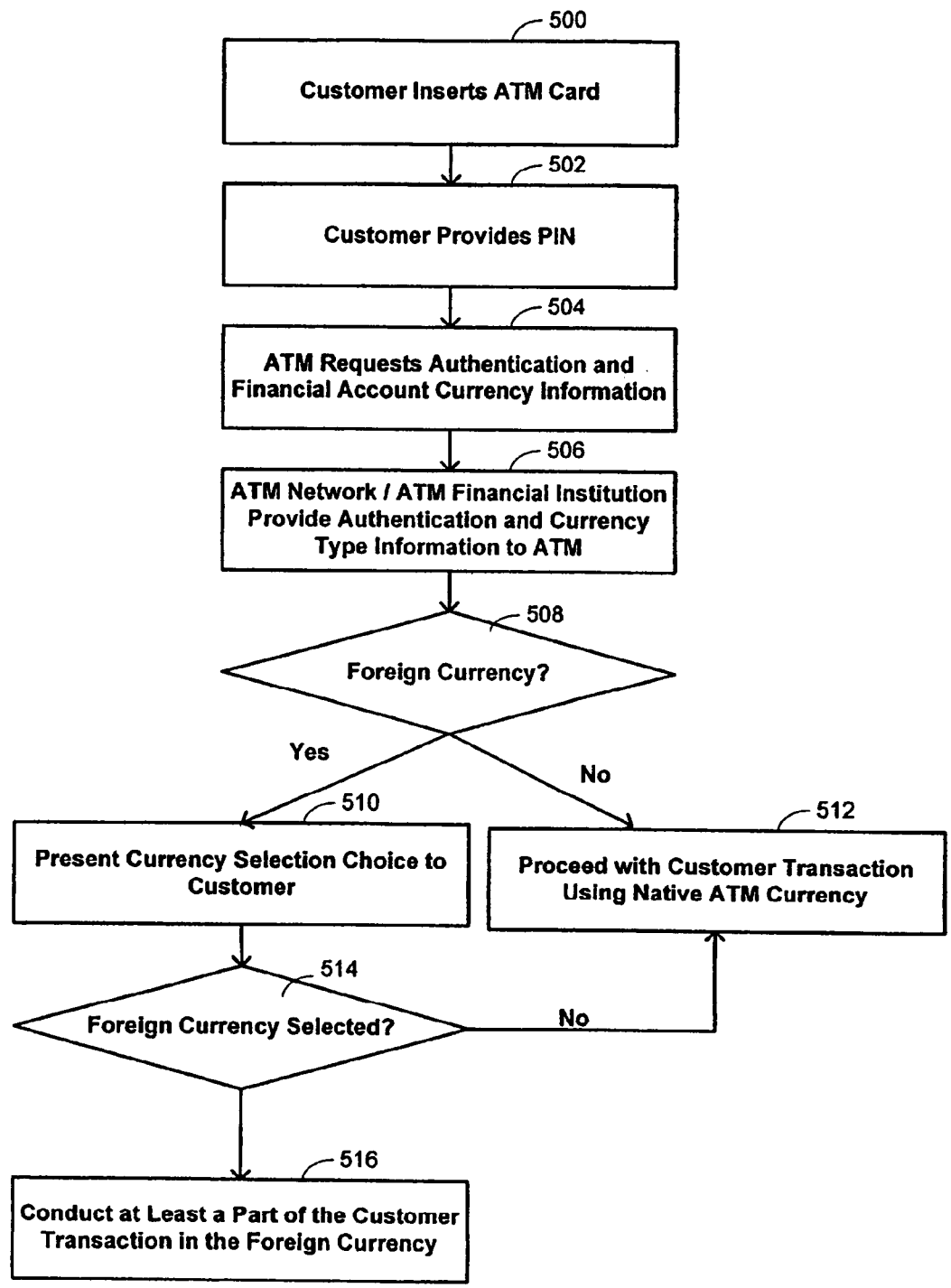
FIG. 5 is a flow diagram illustrating an exemplary method for conducting a transaction at an ATM.

FIG. 5 is a flow diagram illustrating an exemplary method that may be used to conduct a transaction at an ATM. The method may begin when a customer inserts 500 an ATM card (e.g., debit card, credit card) into a card reader. The card reader obtains a financial account identifier associated with a financial account maintained by the customer at a financial institution from the ATM card. The customer may also provide 502 a PIN associated with the financial account.

The ATM may then transmit 504 one or more packet(s) to an ATM network 108 or a financial institution 106 associated with the ATM to authenticate the financial account identifier and PIN. Additionally, the ATM may also request financial account currency information for a currency type associated with the customer's financial account. The ATM may include this request in the authentication packet or may submit a second packet requesting the currency type information. Alternately, the currency type information may be provided to the ATM by either ATM network 108 or associated financial institution 106 without an explicit request from the ATM.

The customer's account identifier and PIN are then authenticated. If the ATM request was sent to a financial institution 106 associated with the ATM, the authentication may be performed by the financial institution 106 if the customer's financial account is maintained at the same or affiliated financial institution. Otherwise, ATM network 108 may be used to perform the authentication by communicating with the customer's financial institution 110 to authenticate the customer's financial account and associated PIN.

Additionally, ATM network 108 or financial institution 106 may determine a currency type associated with the financial account. The determination may be made by transmitting a request to a Currency Recognition and Exchange Service 112 or by accessing currency type information stored locally or otherwise made available to ATM network 108/financial institution 106. By way of example, an identifier lookup table 306 may be used to match a financial institution identifier portion (e.g., BIN) of the financial account to a currency type or country. In some embodiments, an exception table may also be consulted to determine whether an exception exists to the mapping rules in the lookup table for the customer's financial account. For instance, the financial institution identifier portion may fall in a range of identifiers normally assigned to U.S. financial institutions, but the particular identifier may be an exception and be assigned to a Canadian financial institution.

The ATM network 108 or associated financial institution 106 then provides 506 the authentication and currency type information to the ATM. This information may be provided in one or more transmittal packets. In some instances, the customer account information may not be authenticated, either because of an invalid PIN, account inactivation, or other problem. In these instances, the ATM network 108 or financial institution 106 may only transmit a rejection of the authentication information without associated currency type and the method may end with a notification provided to the customer that the account information could not be authenticated. In some embodiments, a determination of currency type may not be made until after the account information provided by the customer has been authenticated.

If 508 the currency type associated with the customer's financial account is the same as the ATM's native currency, the ATM may proceed 512 with the customer transaction using the native ATM currency type. Otherwise, if the customer account is associated with a foreign currency type different from the ATM's native currency type, the customer may be presented 510 with a currency selection choice. For instance, if the customer's financial account is maintained in the United States, but the customer is using an ATM in Great Britain, the ATM may present 510 the customer a choice to conduct the transaction in Great Britain Pounds (the ATM's native currency) or U.S. Dollars.

If 514 the customer does not select the foreign currency, the ATM proceeds 512 with the customer transaction using the native ATM currency. Otherwise, if the foreign currency is selected, at least a part of the customer's transaction at the ATM is conducted in the foreign currency. This process will be described in detail with reference to FIG. 6, which illustrates a withdrawal transaction. However, as will be appreciated, other types of transactions may also be conducted using the foreign currency.

In alternate embodiments, the process of conducting a financial transaction at an ATM may be different than described in reference to FIG. 5. For example, the customer may provide the financial account identifier to the ATM in a manner different than by inserting 500 a card into a card reader. By way of example, the customer may enter the financial account identifier using a keypad or other mechanism. As another example, in alternate embodiments, the ATM may not request 504 currency type information, but instead may itself determine the currency type associated with the financial account by accessing information local to the ATM or otherwise made available to the ATM. As a third example, currency type information may not be requested 504 or provided 506 to the ATM, but instead the customer may be presented with a variety of predetermined choices for the currency type to use to conduct a financial transaction. It should also be appreciated that in alternate embodiments, the method of performing a financial transaction at an ATM may not include all the blocks illustrated in FIG. 5. For instance, the customer may not be presented with a currency selection choice 510, but instead the transaction may be automatically conducted in the foreign currency type.

Figure 6:
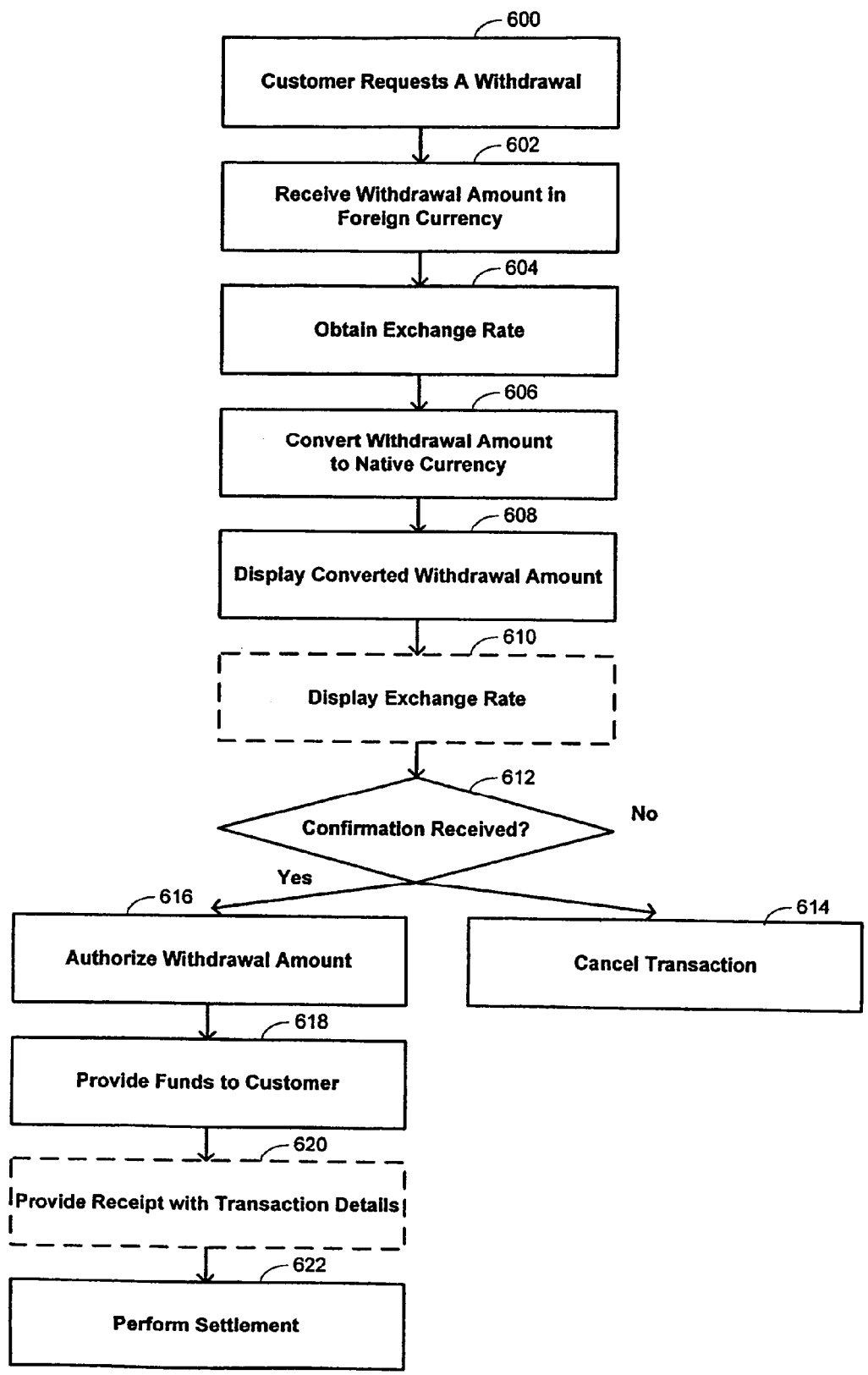
FIG. 6 is a flow diagram illustrating an exemplary withdrawal transaction.

Referring to FIG. 6, a method of conducting a financial transaction in a foreign currency type different than the ATM's native currency type will now be described. FIG. 6 illustrates an exemplary withdrawal transaction, including credit card withdrawals. However, with minor modifications that may easily be made, the principles of the method may be applied to other types of financial transactions conducted at an ATM, such as balance inquiries, transfer of funds, purchases made at the ATM (e.g., for stamps, telephone calling cards, etc.), bill payment, electronic purse transactions, or other types of transactions that may be performed at an ATM.

The method may begin by the customer requesting 600 a withdrawal transaction be performed at the ATM. If the customer account information has not been authenticated, a method similar to that described with reference to FIG. 5 may be performed with the customer selecting 514 to at least partially conduct the financial transaction in a foreign currency type different than the ATM's native currency type. The ATM may then receive 602 a withdrawal amount from the customer in the foreign currency. For example, a customer at an ATM located in Great Britain may enter a withdrawal amount in U.S. Dollars.

The ATM may then obtain 504 an exchange rate to convert from the foreign currency to the native currency. The exchange rate may be obtained from an ATM network 108, a financial institution 106 associated with the ATM, Currency Recognition and Exchange Service 112, or exchange rate information stored locally or otherwise accessible to ATM. As previously described, in some embodiments, exchange rate information may be obtained by ATM network 108 or financial institution 106 from Currency Recognition and Exchange Service 112.

After the exchange rate has been obtained 604, the ATM may the convert 606 the withdrawal amount to the ATM's native currency. Alternately, the ATM may provide the withdrawal amount to ATM network 108, financial institution 106, or Currency Recognition and Exchange Service 112 and the conversion may be performed by one of these components 108, 106, 112. By way of example, ATM network 108 or financial institution 106 may obtain the exchange rate from Currency Recognition and Exchange Service 112 or from locally stored or otherwise accessible information, perform the conversion, and provide the converted amount to the ATM or the conversion may be performed by Currency Recognition and Exchange Service 112.

The converted withdrawal amount is then displayed 608 or otherwise presented to the customer. Optionally, the exchange rate used to perform the conversion may also be displayed 610 or provided to the customer. In some embodiments, the conversion 606 may result in a withdrawal amount that is not supported by the ATM. For instance, the conversion may result in denominations that may not be withdrawn from the ATM (e.g., withdrawal of change, or smaller bills). In these embodiments, the converted withdrawal amount may be modified to a denomination supported by the ATM. The modification may be made by rounding to the nearest denomination, rounding to the next highest supported denomination, or rounding down to the next lowest supported denomination. Thus, the modified withdrawal amount may be presented 608 instead of or in addition to the initially converted amount. Alternately, the customer may be presented with a choice to select whether to increase the withdrawal amount (round up) or decrease the withdrawal amount (round down). In some embodiments, the modified withdrawal amount may be converted to the foreign currency type (the customer's native currency) and displayed or otherwise provided to the customer so that the customer is made aware of the exact corresponding transaction amount in the customer's native currency. This information may be presented to the customer as part of the presentation of the modified converted withdrawal amount, or may be provided to assist the customer in making the choice whether to increase or decrease the amount.

After being presented 608 with the converted withdrawal amount, which may have been modified from the initial conversion amount, the customer may then be asked to confirm 612 that he or she wants to proceed with the transaction. If the customer does not wish to proceed after the information has been presented, the transaction may be canceled 614 or the customer may be presented with a choice to enter a different withdrawal amount 602. Otherwise, the method may proceed with authorization 616 of the withdrawal amount.

After the withdrawal amount has been authorized 616, the funds are provided to the customer 618. Optionally, the customer may also be provided with a receipt 620. The receipt may indicate one or more transaction details, such as the ATM native currency amount withdrawn, the corresponding foreign currency amount (the customer's native currency), and the exchange rate used. In some embodiments, the receipt may also contain the customer's current account balance in the customer's native currency after the funds were withdrawn.

Although the customer has concluded his or her interaction with the ATM, at some point in time, a settlement may need to be performed 622 to transfer funds from the financial institution at which the customer maintains the financial account and the financial institution or other entity responsible for providing the funds to the customer via the ATM.

It should be appreciated that the method of conducting a withdrawal transaction may be performed differently than illustrated in FIG. 6. For instance, the customer may not be prompted to confirm the withdrawal amount. Alternately or additionally, the withdrawal amount may be converted to the native currency as part of the authorization 616 process. As another example, in other embodiments, the ATM may receive 602 the withdrawal amount from the customer in the ATM's native currency and the withdrawal amount may be converted to the foreign currency. The customer may then be asked to confirm the amount or the ATM may only display the foreign currency amount (and possibly the exchange rate) using a display and/or on a receipt provided to the customer. Other variations are also contemplated.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware, firmware, and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   receiving, at an Automated Teller Machine (ATM) a financial account number associated with a financial account maintained by a customer at a financial institution;
   determining a foreign currency type associated with the financial account;
   at the ATM, presenting to the customer a choice to conduct a financial transaction in the foreign currency type;
   receiving a currency selection from the customer; and
   conducting at least a portion of the financial transaction at the ATM in the selected currency, wherein determining the foreign currency type associated with the financial account comprises:
   obtaining an identifier portion of the financial account number; and
   determining a country associated with the financial institution using the identifier portion, and
   wherein determining the country comprises comparing the identifier portion to a lookup table, the lookup table associating financial institution identification numbers to a country; and
   wherein determining the currency type further comprises comparing the identifier portion to an exception table associating financial institution identification numbers to a country different than the one indicated in the lookup table.

2. The method of claim 1, wherein obtaining an identifier portion comprises determining a bank identification number (BIN) portion of the financial account number.

3. The method of claim 1, wherein receiving the currency selection comprises receiving a selection indicating the foreign currency type.

4. The method of claim 3, wherein conducting at least a portion of the financial transaction comprises receiving a withdrawal amount in the foreign currency type.

5. The method of claim 4, wherein conducting at least a portion of the financial transaction further comprises:
obtaining an exchange rate to convert the foreign currency type to a native currency type associated with the ATM;
converting the withdrawal amount to the native currency type.

6. The method of claim 5, further comprising presenting the converted withdrawal amount to the customer.

7. The method of claim 6, further comprising displaying the exchange rate to the customer.

8. The method of claim 6, further comprising receiving a confirmation from the customer to proceed with the transaction.

9. The method of claim 6, further comprising presenting an account balance in the foreign currency type indicating the balance of the financial account after the withdrawal.

10. The method of claim 5, further comprising modifying the converted withdrawal amount to be a denomination amount supported by the ATM for withdrawal.

11. The method of claim 10, wherein modifying the converted withdrawal amount comprises rounding the converted withdrawal amount to the nearest denomination amount supported by the ATM for withdrawal.

12. The method of claim 10, wherein modifying the converted withdrawal amount comprises receiving a modification choice from the customer to one of increase the withdrawal amount or decrease the withdrawal amount.

13. The method of claim 10, further comprising displaying the modified withdrawal amount to the customer.

14. The method of claim 13, further comprising:
converting the modified withdrawal amount to the foreign currency type;
presenting the converted modified withdrawal amount to the customer.

15. The method of claim 3, wherein conducting at least a portion of the financial transaction further comprises:
receiving a withdrawal amount in a native currency type associated with the ATM;
obtaining an exchange rate to convert the native currency type to the foreign currency type;
converting the withdrawal amount to the foreign currency type; and
displaying the converted withdrawal amount to the customer.

16. The method of claim 15, further comprising displaying the exchange rate to the customer.

17. The method of claim 15, further comprising receiving a confirmation from the customer to proceed with the transaction.

18. A method comprising:
receiving, at an Automated Teller Machine (ATM) network, a request from an ATM to obtain a currency exchange rate to convert from a first currency to a second currency;
obtaining the currency exchange rate;
providing the currency exchange rate to the ATM;
receiving, at the ATM network, an identifier from the ATM, the identifier identifying a financial institution associated with a financial account;
using the identifier to determine a currency type associated with the financial institution;
providing the currency type to the ATM; and
wherein using the identifier comprises comparing the identifier to a list of identifiers in the lookup table; and
wherein determining the currency type further comprises comparing the identifier to an exception table associating financial institution identification numbers to a country different than the one indicated in the lookup table.

19. The method of claim 18, wherein obtaining the currency exchange rate comprises obtaining the currency exchange rate from a currency recognition and exchange service.

20. A method comprising:
receiving, at an Automated Teller Machine (ATM) a financial account number associated with a financial account maintained by a customer at a financial institution;
determining a foreign currency type associated with the financial account;
at the ATM, presenting to the customer a choice to conduct a financial transaction in the foreign currency type;
receiving a currency selection from the customer;
conducting at least a portion of the financial transaction at the ATM in the selected currency,
wherein determining the foreign currency type associated with the financial account comprises:
obtaining an identifier portion of the financial account number;
determining a currency associated with the financial institution using the identifier portion; and
wherein determining the currency comprises comparing the identifier portion to a lookup table, the lookup table associating financial institution identification numbers to a currency; and
wherein determining the currency type further comprises comparing the identifier portion to an exception table associating financial institution identification numbers to a country different than the one indicated in the lookup table.

* * * * *